United States Patent Office 3,068,280
Patented Dec. 11, 1962

3,068,280
PROCESS FOR PRODUCTION OF AROMATIC
CARBOXYLIC ACIDS
Ewald Katzschmann, Dortmund-Kruckel, Germany, assignor to Chemische Werke Witten Gesellschaft mit beschrankter Haftung, a corporation of Germany
No Drawing. Filed Jan. 23, 1958, Ser. No. 710,611
Claims priority, application Germany Aug. 6, 1951
4 Claims. (Cl. 260—523)

This invention relates to a process for converting alkyl substituted aromatic ethers to the corresponding aromatic carboxylic acids. It especially relates to the conversion of tolyl ethers to toluic acids and phthalic acids.

The present application is a continuation-in-part of my copending application Serial No. 301,595, filed July 29, 1952, now U.S. Patent No. 2,821,551, and entitled "Process for Production of Aromatic Carboxylic Acids."

It is known that benzyl ether may be oxidized by being heated at elevated temperatures with the passage of air therethrough to yield principally benzaldehyde and benzoic acid in the order of about 15%.

Alkyl substituted aromatic alcohols, such as p-, m-, and/or o-methyl benzyl alcohol and their homologues, which might be regarded as oxidation products of alkyl aromatic hydrocarbons, though they are produced from other starting materials and by other methods, can be oxidized only very slowly by means of elemental oxygen or oxygen-containing gases to the corresponding mono- or polycarboxylic acids. It was the problem of converting aromatic alcohols into aromatic acids that led to the present invention.

It is one object of the present invention to provide a simple and effective process of oxidizing such alcohols to the corresponding carboxylic acids by means of oxygen or oxygen containing gases.

Other objects of the present invention and advantageous features thereof will become apparent as the description proceeds.

Broadly stated, the process according to the present invention comprises oxidizing alkyl substituted aromatic ethers to convert same into aromatic carboxylic acids by subjecting said ethers to the oxidizing action of oxygen-containing gases. It is quite surprising that said ethers can be oxidized so readily and rapidly. Thus, by converting the aromatic alcohol into the corresponding ether a compound having far greater oxidative reactivity is obtained.

It is also very surprising that, in general, only the ether group is oxidized and that the alkyl substituent and especially the methyl substituent remains intact.

Especially suitable, readily oxidizable ethers are ethers of the formula $$R\text{—}O\text{—}R_1$$

wherein

R represents the radical of an aromatic alcohol having at least one alkyl substituent and especially a methyl benzyl radical and wherein $R_1$ may be the radical of an aromatic alcohol having at least one alkyl substituent and especially a methyl benzyl radical, or a lower alkyl radical and especially a methyl radical.

Ethers within the invention include, among others, bis-(o-, m-, or p-methyl dibenzyl) ether; o-, m-, or p-methyl benzyl methyl ether; and o-, m-, or p-methyl benzyl ethyl ether.

The source of the ethers is of no significance for the process of oxidation according to the invention. However, a convenient method of preparing the ethers is through the aromatic alcohol. By chloromethylation of an alkyl substituted aromatic hydrocarbon, such as toluene, and subsequent hydrolysis in the presence of the respective alcohol the aromatic hydrocarbon may directly be converted to the ether of the above given formula. The aromatic alcohols obtainable from the chloromethylation products may first be produced by hydrolysis and may then be etherified. Said alcohols or the ether derivatives of these alcohols can be separated in known fashion into the pure isomers and then oxidized or the mixture of isomers can be processed directly.

The following examples serve to illustrate the process of this invention without, however, being limited thereto.

*Example 1*

A mixture of 1380 g. of toluene and 1536 g. of 31.5% formaldehyde solution is saturated with hydrogen chloride gas (555 g.) between 0° C. and 12° C. with stirring and then heated with stirring and with continuous introduction of hydrogen chloride to 70° C. until no more gas is absorbed. The oil which separates is washed free of acid with water and sodium carbonate solution and, after drying over calcium chloride, is subjected to fractional distillation at an absolute pressure of 12 mm. Hg. The fraction which distills at about 79° C. (about 1550 g.) is chloromethyl toluene.

421.5 g. of said chloromethyl toluene are stirred into a solution of 132 g. of sodium hydroxide in 1500 cc. of methanol at room temperature. After the reaction which proceeds spontaneously has ceased, the mixture is refluxed for one hour with stirring. After cooling, sodium chloride which has separated is dissolved with as little water as possible, the methyl benzyl methyl ether is taken up in petroleum ether and, after drying over sodium sulfate, is distilled at an absolute pressure of 12 mm. Hg. The resulting methyl benzyl ether has a boiling point of 70.5–71.5° C./12 mm. The yield is about 95%.

1000 g. of said methyl benzyl methyl ether are mixed with 1 g. of a soluble cobalt salt, for example, with the cobalt salt of fatty acids with 7–9 carbon atoms obtained by oxidation of paraffins, and are oxidized at 140° C. with 1.5 liters of air per minute. Rapid oxidation occurs, as is evident from the increase of acid and saponification numbers:

After 6 hours acid No.=58; saponific. No.=148;
After 30 hours acid No.=209; saponific. No.=380;
After 42 hours acid No.=236; saponific. No.=414.

Thereupon, introduction of air is discontinued. 950 g. of an oxidation product A are obtained as residue in the reaction vessel while 85 g. are carried along with the air current and are recovered as distillate in a suitable receiver attached to a condenser. 15 g. of oxidation product are used for sampling to determine the acid and saponification number. The total yield, thus, is 1050 g.

945 g. of the oxidation product A are saponified by boiling under reflux with 915 g. of 45% potassium hydroxide solution. As soon as saponification is completed, unsaponifiable matter is extracted by means of ethyl ether from the saponification mixture. 42 g. of unsaponifiable matter are obtained (acid number: 1.0; saponification number: 1.8).

The extracted saponification solution which is free of unsaponifiable matter is acidified by the addition of dilute hydrochloric acid (1:1). The precipitated acids are filtered with suction, washed with water until free of hydrochloric acid, and dried. 828 g. of toluic acid with a small content of dicarboxylic acid are obtained. Characteristic properties of said acid:

Acid No.: 417; saponification No.: 425.
Theoretical acid No.: 412 (for toluic acid).

The aqueous hydrochloric acid filtrate is extracted with ethyl ether, the ethereal solution is dried over sodium sulfate, and the ether is distilled off whereby 62 g. of toluic acid are obtained so that the total yield resulting from the saponification of 945 g. of the oxidation product A is 890 g.

If a 50/50 mixture of o- and p-tolyl alcohol is treated with air under the same conditions, the oxidation takes place only extremely slowly; after 35 hours the acid number amounts to only 2, the saponification number to 18.

*Example 2*

140.5 g. of chloromethyl toluene prepared according to Example 1, are refluxed with 1300 cc. of N sodium carbonate solution. The resulting methyl benzyl alcohol is taken up in ether and, after evaporation of the ether, is converted into the dixylyl ether by heating for several hours under reflux with separation of the water from the reflux condensate.

500 g. of the resulting mixture of dixylyl ethers obtained in this manner (about 70% of p- and 30% of o-compounds) are oxidized in the presence of 0.1% of the cobalt salt used in Example 1 with 1.5 liters of air per minute at 140° C. by following the procedure described in said Example 1:

After 3 hours acid No.=22; saponific. No.=44;
After 15 hours acid No.=59; saponific. No.=100;
After 30 hours acid No.=151; saponific. No.=214;
After 45 hours acid No.=189; saponific. No.=279.

Thereupon, introduction of air is discontinued. 510 g. of oxidation product are obtained as residue in the reaction vessel while 18 g. are recovered as distillate in a suitable receiver. 22 g. are used for sampling. The total yield, thus, is 550 g.

510 g. of said oxidation product and 18 g. of said distillate are saponified by boiling under reflux with 320 g. of 45% potassium hydroxide solution. As soon as saponification is completed, unsaponifiable matter is extracted by means of diethyl ether from the saponification mixture. 166 g. of unsaponifiable matter are obtained.

The extracted saponification solution, free of unsaponifiable matter, is acidified by the addition of dilute hydrochloric acid (1:1). The precipitated acids are filtered with suction, washed with water, and dried. 340 g. of toluic acids containing a small amount of dicarboxylic acid are obtained. Extraction of the aqueous hydrochloric acid filtrate yields an additional amount of 6 g. of toluic acids so that the total yield is 346 g.

If 600 g. of a dixylyl ether containing more o-compound is similarly oxidized, the oxidation proceeds even more rapidly.

After 3 hours acid No.=30; saponific. No.=58;
After 15 hours acid No.=70; saponific. No.=127;
After 30 hours acid No.=205; saponific. No.=280;
After 45 hours acid No.=226; saponific. No.=353.

Thereupon, introduction of air is discontinued. 620 g. of oxidation product and 62 g. of distillate are obtained while 20 g. of the oxidation product are used for sampling. The total yield, thus, is 702 g.

675 g. of the mixture of oxidation product and distillate are saponified and worked up as described hereinabove. The yield of toluic acids with a small content of dicarboxylic acid is 460 g.

As stated hereinabove, oxidation is carried out at elevated temperature. Although a temperature of about 140° C., as used in the preceding examples, has proved especially suitable, oxidation can be carried out at a temperature between about 80° C. and about 180° C.

Oxidation may also be carried out under atmospheric pressure or under elevated pressure. Operating under a pressure between about 3 atmospheres and about 12 atmospheres has yielded satisfactory results. However, working at atmospheric pressure is simpler to perform.

It is readily possible to determine the time required for oxidation by determining the acid and saponification numbers of samples taken from the oxidation mixture. As soon as no more substantial increase in the values of said characteristic numbers is observed, introduction of the oxygen-containing gas is discontinued and the oxidation mixture is worked up as described in the preceding examples.

Saponifying agents other than potassium hydroxide solution and solvents for extracting unsaponifiable matter other than ether may be used.

I claim:

1. The process of producing a toluic acid of the formula

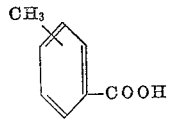

consisting in oxidizing an ether of an aromatic alcohol of the formula

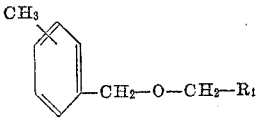

wherein
$R_1$ is a member selected from the group consisting of hydrogen, lower alkyl, and methyl substituted phenyl, in the liquid phase with a gas containing elemental oxygen at a temperature between about 80° C. and about 180° C. in the presence of a soluble cobalt salt as oxidation catalyst.

2. The process of producing toluic acids consisting in oxidizing the methyl ether of a methyl substituted benzyl alcohol in the liquid phase with a gas containing elemental oxygen at a temperature of about 140° C. in the presence of a soluble cobalt salt as oxidation catalyst.

3. The process of producing toluic acids consisting in oxidizing a dixylyl ether in the liquid phase with a gas containing elemental oxygen at a temperature of about 140° C. in the presence of a soluble cobalt salt as oxidation catalyst.

4. The process of producing a toluic acid of the formula

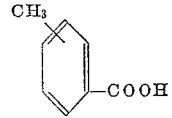

consisting in oxidizing an ether of an aromatic alcohol of the formula

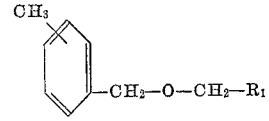

wherein
$R_1$ is a member selected from the group consisting of hydrogen, lower alkyl, and methyl substituted phenyl, in the liquid phase with a gas containing elemental oxygen at a temperature between about 80° C. and about 180° C. in the presence of a cobalt salt of a fatty acid having 7 to 9 carbon atoms as oxidation catalyst.

References Cited in the file of this patent

UNITED STATES PATENTS 2,497,889   Hull _____ Feb. 21, 1950
2,561,350   Eichel _____ July 24, 1951